United States Patent [19]
Kang et al.

[11] Patent Number: 5,621,585
[45] Date of Patent: Apr. 15, 1997

[54] REEL BRAKE DEVICE OPERATED BY A TAPE LOADING MECHANISM OF MAGNETIC RECORDING AND REPRODUCING APPARATUS

[75] Inventors: Seong-Sik Kang; Sung-Hoon Choi, both of Kyungki-Do; Myung-Cheol Baek, Seoul; Sung-Pyo Hong, Kyungki-Do; Ji Y. Lee; Lee H. Ryu, both of Seoul; Soo-Beom Lee, Kyungki-Do; Hee Y. Park, Kyungki-Do; Yoon-Sig Lee, Kyungki-Do, all of Rep. of Korea

[73] Assignee: Goldstar Co., Ltd., Rep. of Korea

[21] Appl. No.: 576,854

[22] Filed: Dec. 22, 1995

Related U.S. Application Data

[63] Continuation of Ser. No. 309,882, Sep. 20, 1994, abandoned.

[30] Foreign Application Priority Data

Sep. 27, 1993 [KR] Rep. of Korea ................. 19923/1993

[51] Int. Cl.⁶ .................................................. G11B 5/027
[52] U.S. Cl. .................................................. 360/85
[58] Field of Search ............................. 360/85, 96.3, 95; 242/343, 343.2, 355, 355.1

[56] References Cited

U.S. PATENT DOCUMENTS

| | | | |
|---|---|---|---|
| 4,685,008 | 8/1987 | Ohyama | 360/85 |
| 5,172,283 | 12/1992 | Fukuyama | 360/85 |
| 5,188,311 | 2/1993 | Choi | 360/85 |

*Primary Examiner*—A. J. Heinz

[57] ABSTRACT

A reel brake device in a recording and reproducing apparatus is operated by a tape loading mechanism. A cam portion is formed on any one side of at least one of a pair of loading gears employed for driving a pair of tape guide units which draw a tape from the cassette. The reel brake for braking the reels includes a friction member for braking the supply reel table and an operating portion which comes into contact with a cam surface and a cam protrusion surface of the cam portion selectively so that it may be driven. Under a tape unloading condition, the reel brake performs braking or releasing operation of the reels as the loading gear rotates in a predetermined direction. Driving of the reel brake by the existing loading gear without using any separate driving element, makes it possible to maintain the brake stroke, enhance the accuracy in operation, and reduce the number of elements constituting the supply reel brake device.

4 Claims, 6 Drawing Sheets

REEL BRAKE DEVICE OPERATED BY A TAPE LOADING MECHANISM OF MAGNETIC RECORDING AND REPRODUCING APPARATUS

This application is a continuation of application Ser. No. 08/309,882 filed on Sep. 20, 1994, now abandoned.

BACKGROUND OF THE INVENTION

1. Field of the Invention

The present invention relates to a reel brake device of a magnetic recording and reproducing apparatus, and more particularly to a supply reel brake device of a magnetic recording and reproducing apparatus including a supply reel brake driven by a loading gear equipped in the apparatus, thereby capable of accurately operating the brake.

2. Description of the Prior Art

Referring to FIG. 1, there is illustrated a conventional supply reel brake device equipped in a magnetic recording and reproducing apparatus. As shown in FIG. 1, the supply reel brake device includes a function plate 20 movably mounted on a rear portion of a base plate 100 constituting a part of a body of the magnetic recording and reproducing apparatus. The function plate 20 is disposed in rear of a supply reel table 21 such that it moves laterally. The function plate 20 has a guide slot 20a laterally extending along one side of the lower portion of function plate 20 and a cam slot 20b laterally extending along the central portion of function plate 20. A guide pin 24 is received in the guide slot 20a so as to guide the lateral movement of function plate 20 within a predetermined distance. The guide pin 24 which extends vertically through the guide slot 20a is fixed to the base plate 100.

The supply reel table 21 is rotatably mounted on the base plate 100. In one side of the supply reel table 21, a supply reel brake 22 is disposed. The supply reel brake 22 is pivotally mounted on a shaft 22a fixedly mounted to the base plate 100. A spring 25 is provided which serves to urge the supply reel brake 22 in a direction that the supply reel brake 22 comes into contact with the supply reel table 21. The spring 25 is fixedly mounted at its one end to the base plate 100 and at its other end to one end of the supply reel brake 22. The supply reel brake 22 is provided at its other end, namely, its rear end with an actuating pin 23 received in the cam slot 20b of the function plate 20.

As a cam gear (not shown) rotates, the function plate 20 slides laterally, namely, in the right or left direction in accordance with the rotation direction of the cam gear. By this linear movement of the function plate 20, the supply reel brake 22 operatively connected to the actuating pin 23 received in the cam slot 20b of the function plate 20 brakes or releases the supply reel table 21.

However, the conventional supply reel brake device involves a difference between normal and reverse strokes because the supply reel brake 22 is actuated by the linear movement of the function plate 20 (that is, using the function plate 20 as a drive source). Moreover, the function plate 20 may be bent where it is large in size. In this case, there is a problem that the supply reel brake is inaccurately controlled.

SUMMARY OF THE INVENTION

Therefore, an object of the invention is to provide a supply reel brake device of a magnetic recording and reproducing apparatus including a supply reel brake actuated by a cam provided at a loading gear equipped in the apparatus, thereby capable of achieving an accurate supply reel brake operation.

In accordance with the present invention, this object can be accomplished by providing a supply reel brake device of a magnetic recording and reproducing apparatus comprising: a cam provided at a tape guide unit-driving loading gear equipped in the apparatus; and a supply reel soft brake adapted to brake a supply reel equipped with the apparatus, the supply reel soft brake having a contact portion operatively connected to the cam, whereby the supply reel soft brake is driven by the loading gear when the loading gear rotates from an unloading position to a loading position for an unloading operation or from the unloading position to the loading position for an loading operation.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
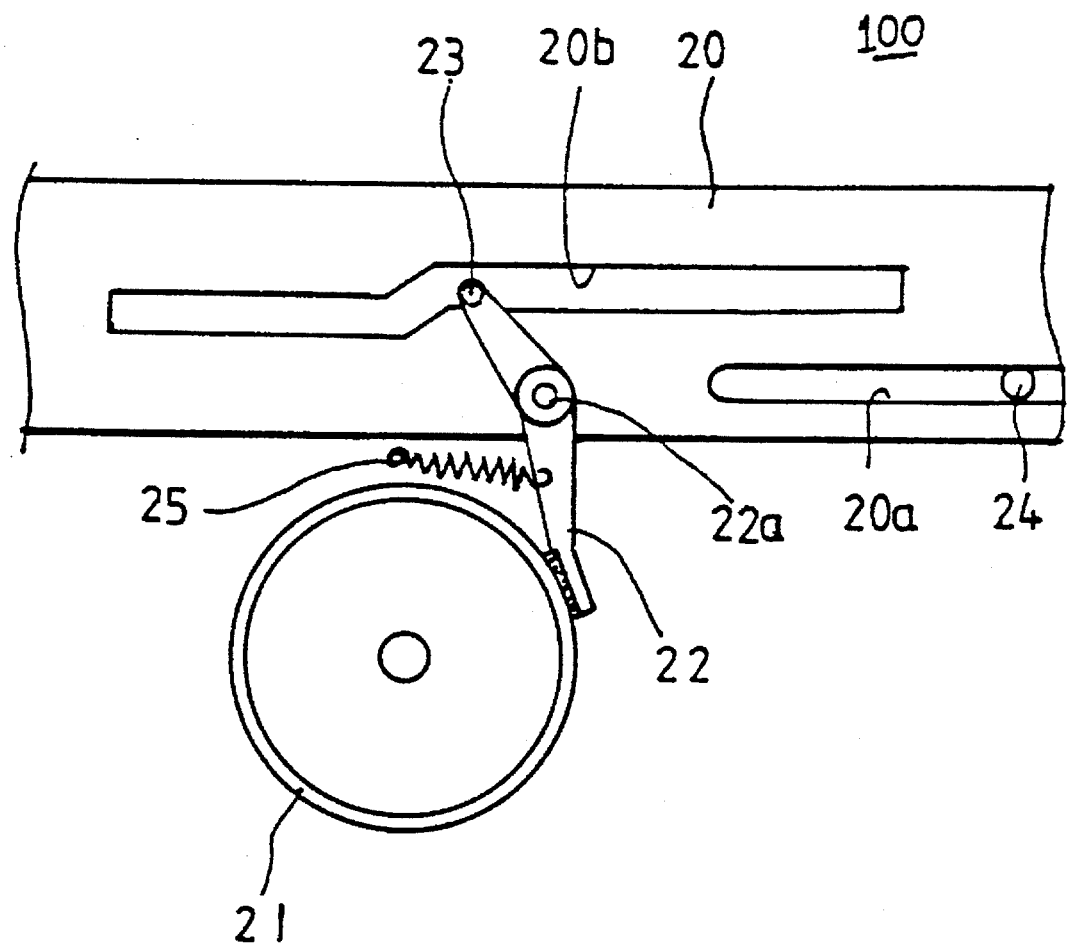
FIG. 1 is a schematic plan view illustrating a conventional supply reel brake device equipped in a magnetic recording and reproducing apparatus.
Figure 2:
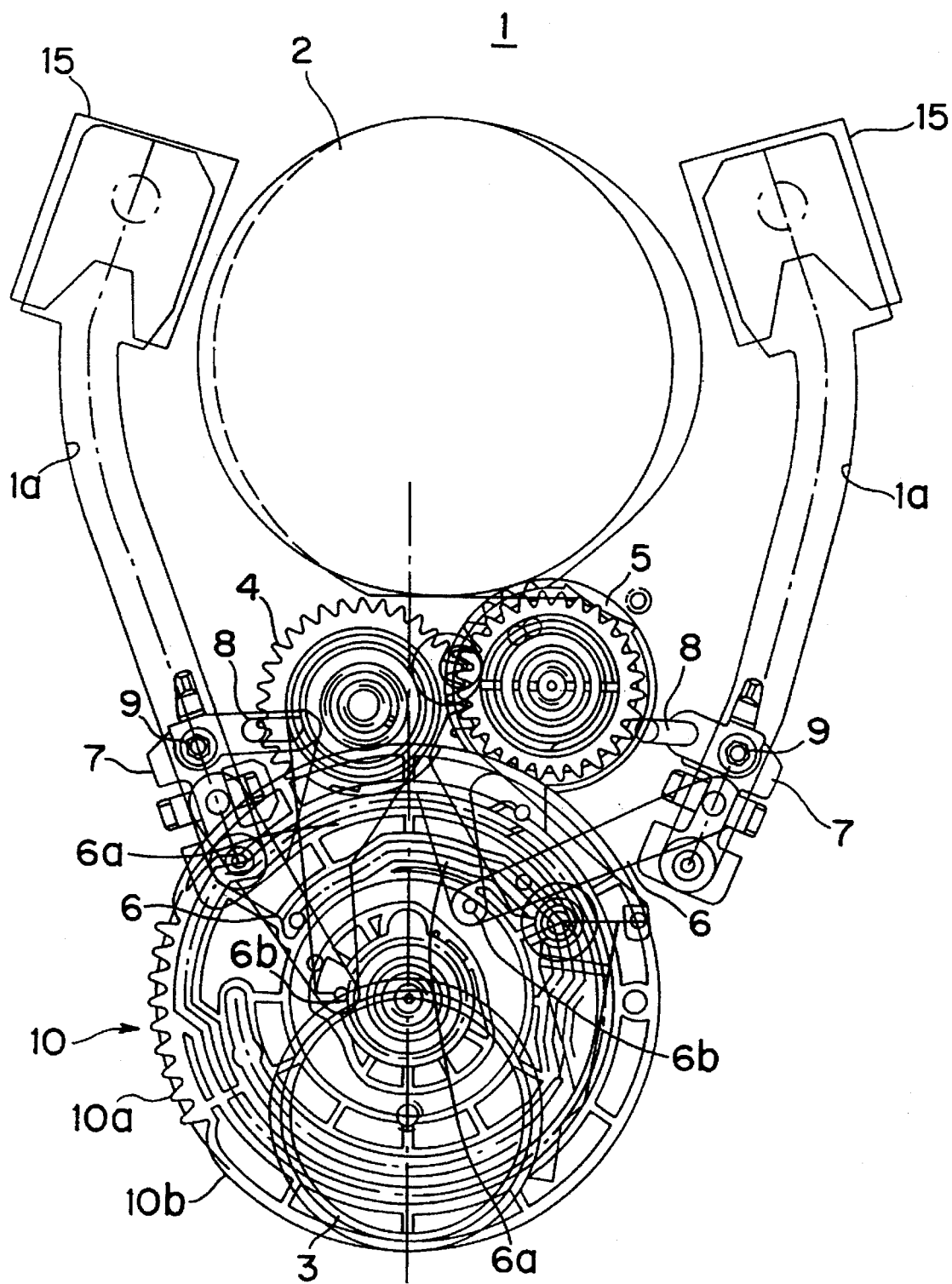
FIG. 2 is a plan view illustrating a magnetic recording and reproducing apparatus equipped with a supply reel brake device in accordance with an embodiment of the present invention.
Figure 3:
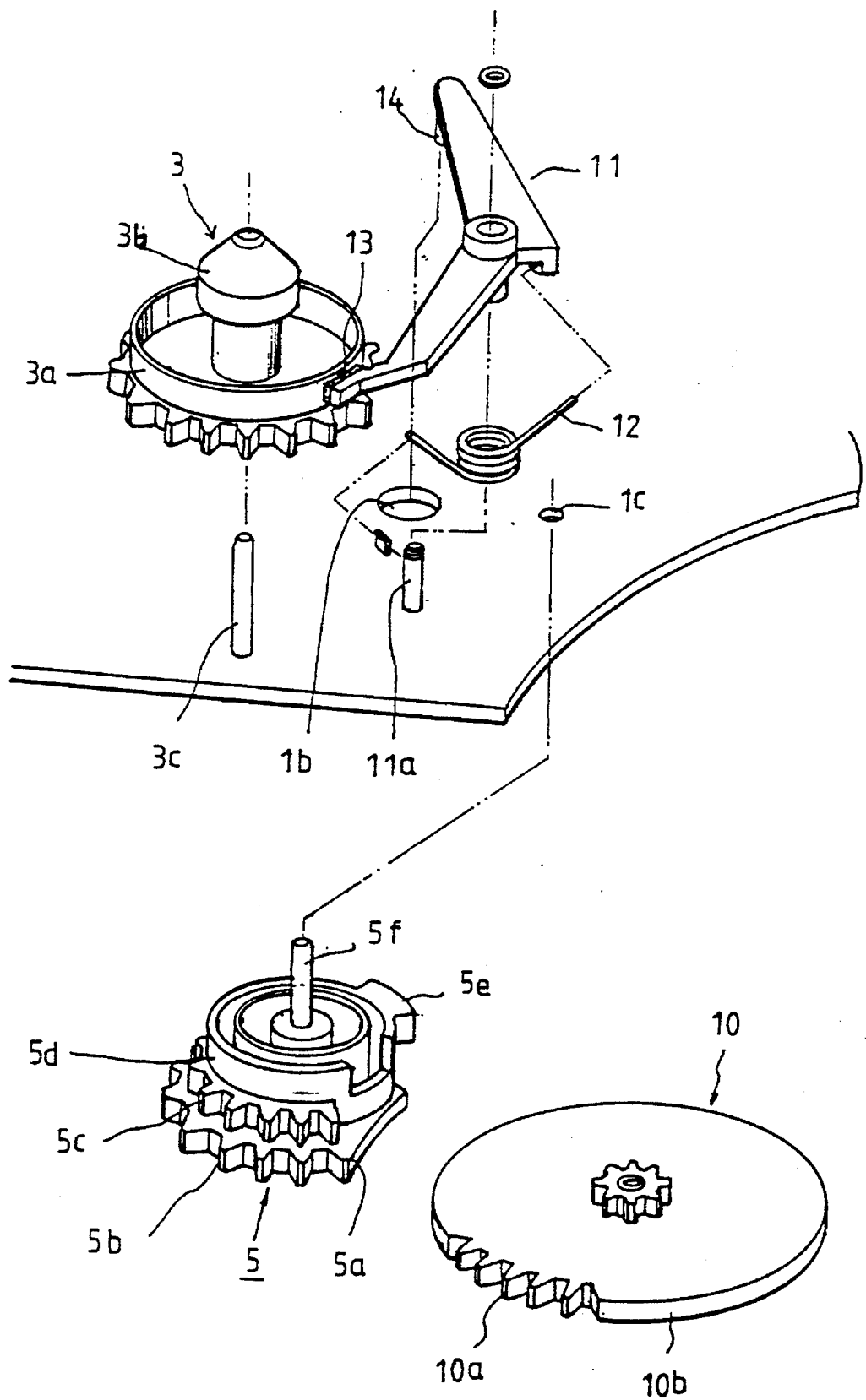
FIG. 3 is an exploded perspective view illustrating the supply reel brake device in accordance with the embodiment of the present invention.

FIG. 2 is a plan view illustrating a magnetic recording and reproducing apparatus equipped with a supply reel brake device in accordance with an embodiment of the present invention. As shown in FIG. 2, the magnetic recording and reproducing apparatus includes a base plate 1, a rotating cylindrical head drum 2 centrally disposed at the rear portion of base plate 1, and a supply reel table 3 mounted on the lower surface of the front portion of base plate 1. The supply reel table 3 has a supply reel die 3a and a supply reel 3b supported by the supply reel die 3a to rotate together with the supply reel die 3a. As shown in FIG. 3, the supply reel table 3 is rotatably fitted around a shaft 3c fixed to the base plate 1. In both sides of the rotating head drum 2, a pair of spaced loading guide slots 1a are provided at the base plate 1. At one end of each guide slot 1a, a position determining member 15 is disposed. The position determining member 15 is fixedly mounted to the base plate 1 by means of screws (not shown). A tape guide unit 7 is received in each guide slot 1a.

In front of the rotating head drum 2, a left loading gear 4 and a right loading gear 5 are rotatably mounted to the base plate 1. The loading gears 4 and 5 are operatively connected to each other. Beneath each of the loading gears 4 and 5, a drive arm 6a is disposed. Each drive arm 6a is operatively connected to each corresponding loading gear by means of a spring (not shown) so that it may pivot about a shaft of the loading gear when the loading gear rotates. Each drive arm 6a is connected to one end of each corresponding link type loading lever 6 by means of a pin 6b so that the link type loading lever 6 pivots about the pin 6b by the pivotal movement of the drive arm 6a. Each link type loading lever 6 is connected at the other end thereof to one end of each corresponding tape guide unit 7. Each tape guide 7 includes a tape guide 8 and a guide roller 9 spaced a predetermined distance apart from the tape guide 8.

At the rear portion of the base plate 1, a cam gear 10 is rotatably disposed beneath the supply reel table 3, as shown in FIG. 3. The cam gear 10 is provided at its periphery with a gear portion 10a and an arc portion 10b having no gear tooth. That is, the cam gear 10 is the discrete gear. The loading gear 5 is driven by the gear portion 10a of cam gear 10 as it engages with the gear portion 10a. On the other hand, the loading gear 5 is maintained at its loading position or its unloading position as it comes into contact with the arc portion 10b of cam gear 10.

Figure 6:
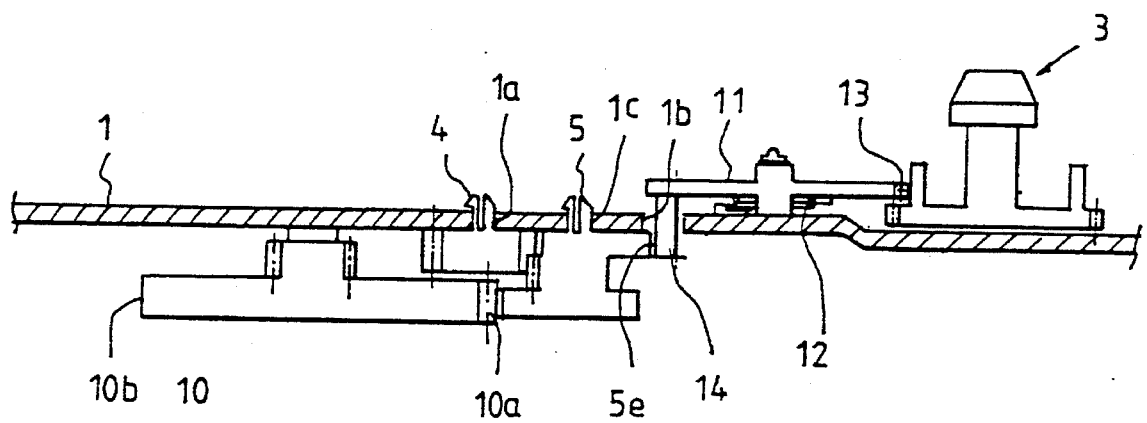
FIG. 6 is a sectional view of the supply reel brake device of FIG. 3, illustrating level relations among elements of the supply reel brake device.

In one side of the supply reel table 3, a supply reel soft brake 11 is disposed so as to brake or release the supply reel table 3, as shown in FIGS. 3 and 6. The supply reel soft brake 11 is pivotally mounted on an upwardly extending shaft 11a fixed to the base plate 1. Around the shaft 11a, a torsion spring 12 is fitted which urges the supply reel soft brake 11 to come into contact with the supply reel die 3a of supply reel table 3. The supply reel soft brake 11 is provided at one end thereof with a friction member 13 for braking the supply reel table 3 and at the other end thereof with an actuating pin 14 downwardly extending through a hole 1b formed at the base plate 1.

Figure 5:
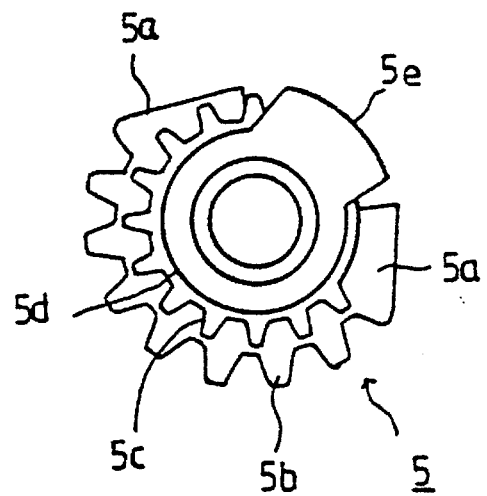
FIG. 5 is a plan view of a right loading gear constituting a part of the supply reel brake device of FIG. 3.

As shown in FIGS. 3 and 5, the right loading gear 5 is provided at its periphery with a pair of spaced position maintaining protrusions 5a each having an arc surface. The right loading gear 5 is also provided at its periphery with a cam pulley gear portion 5b adapted to selectively engage with the gear portion 10a of cam gear 10. Above the cam pulley gear portion 5b, the right loading gear 5 has a left loading gear-driving gear 5c adapted to engage with a gear portion of the left loading gear 4 (FIG. 2). Above the left loading gear-driving gear 5c, the right loading gear 5 also has a cam surface 5d and a cam protrusion surface 5e both having no tooth. The right loading gear 5 is rotatably mounted on a shaft 5f fitted in a hole 1c formed at the base plate 1. The actuating pin 14 of the supply reel soft brake 11 comes into contact with the cam surface 5d and the cam protrusion surface 5e selectively so that it may be driven. Although the supply reel brake device in accordance with the present invention is associated with the right loading gear 5 in the illustrated case, it may be associated with the left loading gear 4 by incorporating the above-mentioned construction with the left loading gear 4.

Now, operation of the supply reel brake device having the above-mentioned construction will be described.

Figure 4A:
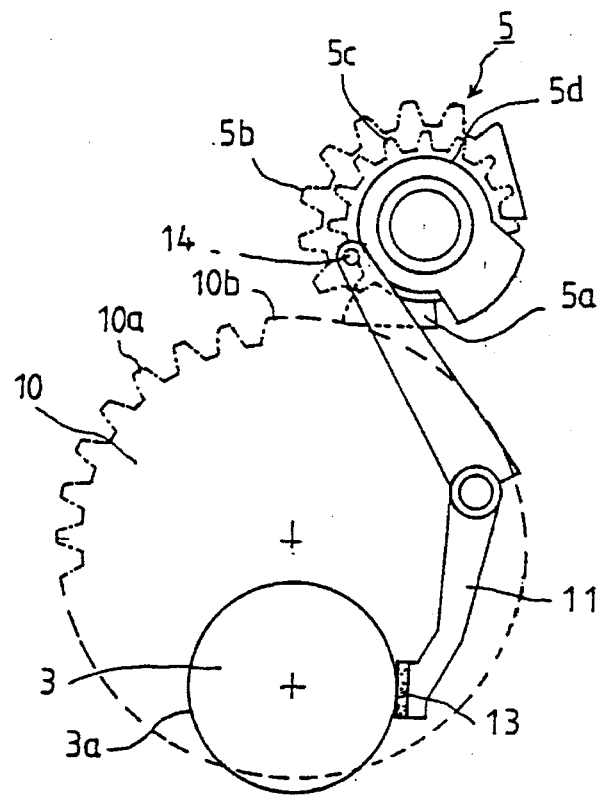
FIG. 4A is a schematic plan view illustrating a condition of the supply reel brake device of FIG. 3 under an unloading condition of the magnetic recording and reproducing apparatus.

FIG. 4A is a plan view illustrating an unloading condition of the magnetic recording and reproducing apparatus. At the unloading condition of the supply reel brake device, the arc portion 10b of the cam gear 10 is in contact with the one-side position maintaining protrusion 5a of right loading gear 5, as shown in FIG. 4A. Under this condition, the right loading gear 5 does not rotate even when the cam gear 10 rotates in clockwise. As the cam gear 10 further rotates in clockwise, the gear portion 10a of cam gear 10 engages with the gear portion 5b of right loading gear 5. By this engagement, the right loading gear 5 rotates in anti-clockwise as the cam gear 10 rotates clockwise. The rotation of right loading gear 5 is transmitted to the left loading gear 4 via the left loading gear-driving gear 5c engaging with the left loading gear 4, thereby causing the left loading gear 4 to rotate clockwise. As a result, the link type loading levers 6 operatively connected to the left and right loading gears 4 and 5 pivot by the rotations of the left and right loading gears 4 and 5, thereby causing the tape guide units 7 to slide along the loading guide slots 1a, respectively.

Operation of the supply reel soft brake 11 under the above-mentioned unloading condition will now be described.

Since under the unloading condition, the arc portion 10b of cam gear 10 is in contact with the one-side position maintaining protrusion 5a of right loading gear 5, while the actuating pin 14 of supply reel soft brake 11 is in contact with the cam surface 5d of right loading gear 5, the friction member 13 of supply reel soft brake 11 comes into contact with the supply reel die 3a of supply reel table 3 by virtue of the spring force of torsion spring 12 (FIG. 3), thereby enabling the rotation of supply reel die 3a to be controlled.

Figure 4B:
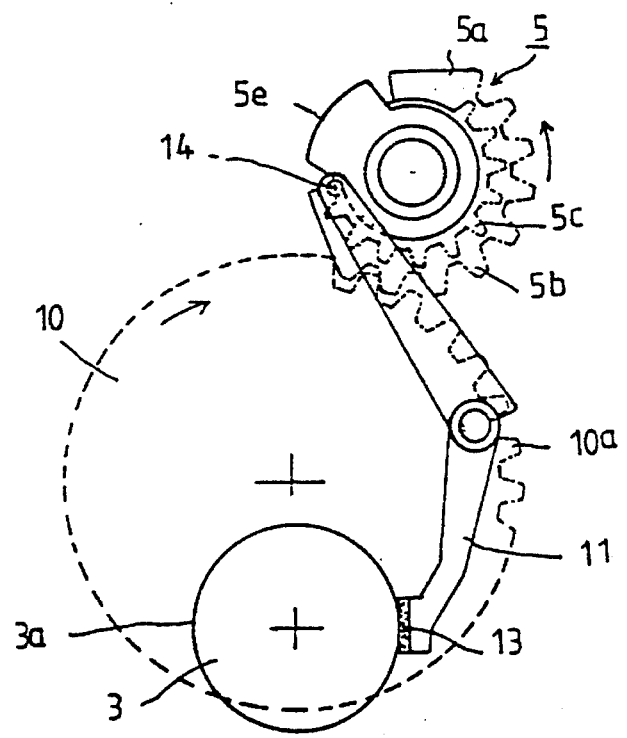
FIG. 4B is a schematic plan view illustrating a condition of the supply reel brake device of FIG. 3 under a loading operation condition of the magnetic recording and reproducing apparatus.

FIG. 4B is a plan view illustrating a loading operation condition of the magnetic recording and reproducing apparatus. As the cam gear 10 rotates continuously clockwise from the unloading condition shown in FIG. 4A, a loading operation is carried out, as shown in FIG. 4B. That is, the gear portion 10a of cam gear 10 engages with the cam pulley gear 5b of right loading gear by the rotation of cam gear 10, thereby causing the right loading gear 5 to rotate anti-clockwise. At this time, the left loading gear 4 also rotates. As a result, the tape guide units 7 slide along the loading guide slots 1a and then come into contact with the position determining members 15 positioned at the upper ends of loading guide slots 1a, respectively.

Figure 4C:
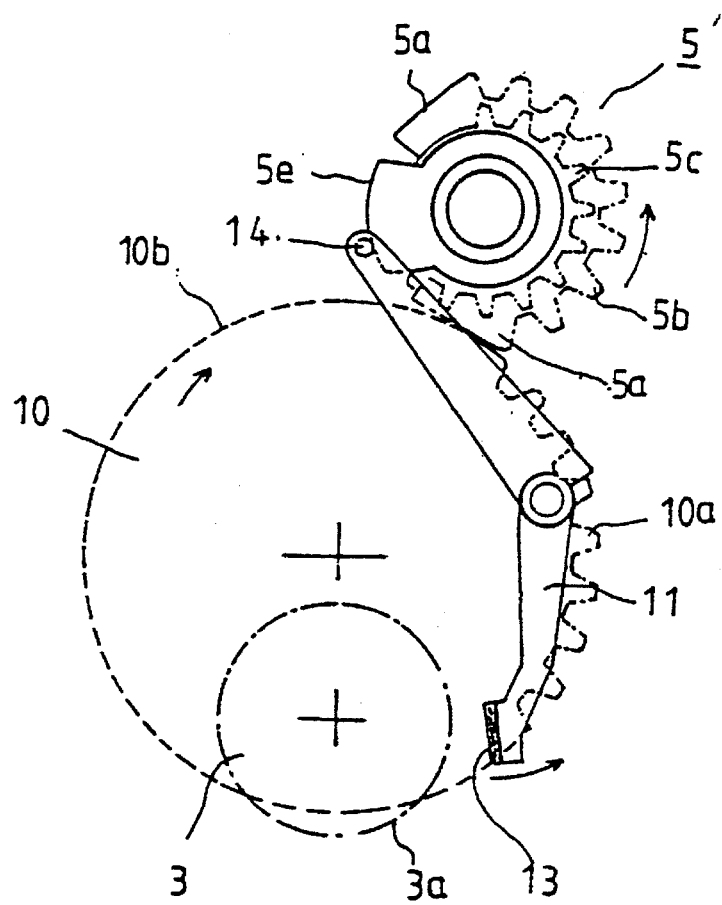
FIG. 4C is a schematic plan view illustrating a condition of the supply reel brake device of FIG. 3 under a loading completion condition of the magnetic recording and reproducing apparatus.

On the other hand, FIG. 4C is a plan view illustrating a loading completion condition of the magnetic recording and reproducing apparatus. When each tape guide unit 7 comes into contact with each corresponding position determining member 15, as shown in FIG. 4B, the actuating pin 14 of supply reel soft brake 11 comes into contact with the cam protrusion surface 5e of right loading gear 5. As the cam gear 10 and the right loading gear 5 further rotate, the actuating pin 14 is safely seated on the cam protrusion surface 5e, as shown in FIG. 4C. As a result, the supply reel soft brake 11 rotates clockwise against the spring force of spring 12, thereby causing the friction member 13 to disengage from the supply reel table 3. Consequently, the friction member 3 controls the rotation of supply reel 3b no longer. At this time, the arc portion 10b of cam gear 10 comes into contact with the other-side position maintaining protrusion 5a, thereby causing the right loading gear 5 to rotate no longer.

As apparent from the above description, the present invention provides a supply reel brake device of a magnetic recording and reproducing apparatus including a supply reel soft brake driven by a cam provided at a loading gear equipped in the apparatus, thereby capable of accurately maintaining the brake stroke. Accordingly, an accuracy in operation is obtained. Since the supply reel soft brake is driven by the existing loading gear without using any separate driving element, it is also possible to reduce the number of elements constituting the supply reel brake device.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A reel brake device for a magnetic recording and reproducing apparatus comprising:

a pair of reels rotatably mounted on a base plate;

a pair of tape guide means each slidable along a loading guide slot in the base plate so as to come into contact with a position determining member provided at an end of said loading guide slot for limiting the movement of the tape guide means;

a pair of loading gears each respectively connected to one of said pair of tape guide means via a plurality of levers rotatably mounted on said base plate for driving said tape guide means;

a brake driving means formed on at least one of said pair of loading gears; and a reel brake means, mounted on a side of said pair of reels, for braking at least one of said pair of reels wherein said reel brake means includes an actuating part contacted at one end thereof with said brake driving means and a contact portion at another end thereof for being contacted with at least one of said pair of reels, and wherein said actuating part of said reel brake means is driven by said brake driving means upon rotation of said at least one of said pair of loading gears for causing said reel brake means to brake and release said at least one of said pair of reels.

2. The reel brake device according to claim 1, wherein said brake driving means includes a protrusion portion protruded substantially from a circumferential portion of said at least one of said pair of loading gears not formed with any teeth.

3. The reel brake device according to claim 1, further comprising a spring which biases said reel brake means into contact with said at least one of said pair of reels.

4. The reel brake device according to claim 1, wherein said actuating part of said reel brake means includes an actuating pin located at said one end of said actuating part, said reel brake means being on one surface of said base plate and said at least one of said pair of loading gears being mounted on an opposite surface of said base plate, said actuating pin of said reel brake means passing through a hole in said base plate in order to come into operating contact with said brake driving means on said loading gear.

* * * * *